(12) United States Patent
Deale

(10) Patent No.: US 9,695,798 B2
(45) Date of Patent: Jul. 4, 2017

(54) WIND SPINNER

(71) Applicant: PREMIER KITES, INC., Hyattsville, MD (US)

(72) Inventor: Valentine B. Deale, Kensington, MD (US)

(73) Assignee: PREMIER KITES, INC., Hyattsville, MD (US)

( * ) Notice: Subject to any disclaimer, the term of this patent is extended or adjusted under 35 U.S.C. 154(b) by 835 days.

(21) Appl. No.: 14/050,929

(22) Filed: Oct. 10, 2013

(65) Prior Publication Data

US 2015/0104321 A1 Apr. 16, 2015

(51) Int. Cl.
*F01D 5/30* (2006.01)
*F03D 1/02* (2006.01)
*F03D 1/06* (2006.01)

(52) U.S. Cl.
CPC ............. *F03D 1/02* (2013.01); *F03D 1/0625* (2013.01); *F03D 1/0666* (2013.01); *Y02E 10/721* (2013.01)

(58) Field of Classification Search
CPC .......... F03B 1/02; F03B 1/025; F03B 1/0625; F03B 1/0633; F03B 1/065; F03B 1/0666; F03B 1/0675; F05B 2220/25
See application file for complete search history.

(56) References Cited

U.S. PATENT DOCUMENTS

| | | | | |
|---|---|---|---|---|
| 1,675,141 A * | 6/1928 | Scholl | ............. | A63H 33/40 40/419 |
| 2,533,110 A * | 12/1950 | Harbert | ............. | F03D 1/0658 116/DIG. 6 |
| 2,545,801 A * | 3/1951 | Wrazen | ............. | A63H 33/40 40/412 |
| 2,638,705 A * | 5/1953 | Petrasy | ............. | A63H 33/40 40/412 |
| 4,065,225 A * | 12/1977 | Allison | ............. | F03D 1/025 416/11 |
| 4,582,497 A | 4/1986 | Lyons | | |
| 5,085,075 A | 2/1992 | Baker | | |
| 5,269,656 A | 12/1993 | Maga | | |
| 6,398,615 B1 * | 6/2002 | Wu | ............. | A63H 33/40 40/440 |
| 6,592,424 B1 * | 7/2003 | Christianson | ........ | A63H 33/40 446/201 |

(Continued)

FOREIGN PATENT DOCUMENTS

CN 101342424 A 1/2009
CN 201308777 Y 9/2009

(Continued)

*Primary Examiner* — Gregory Anderson
*Assistant Examiner* — Alexander White
(74) *Attorney, Agent, or Firm* — Karceski IP Law, PLLC

(57) ABSTRACT

A wind spinner includes a body, at least one rod attached to the body for rotation about a blade axis, at least two blades disposed at opposing ends of the rod, forming at least one pair of blades, and at least one blade support disposed within each blade. The at least one blade support includes a central portion disposable on the at least one rod. The central portion is attached to at least one wing portion that extends outwardly therefrom to provide internal support to the blade. In addition, the blades are angled at a blade angle and at a position on the at least one rod such that wind passing thereover causes the at least one pair of blades to rotate about the blade axis.

17 Claims, 12 Drawing Sheets

(56) References Cited

U.S. PATENT DOCUMENTS

| | | |
|---|---|---|
| 6,678,979 B2 | 1/2004 | Lim et al. |
| 6,776,459 B2 | 8/2004 | Fitzgerald |
| 7,156,044 B1 | 1/2007 | Davis |
| 7,648,339 B1 | 1/2010 | Ediger et al. |
| 2003/0126774 A1* | 7/2003 | Lim ................... G09F 19/08 40/412 |
| 2012/0014795 A1* | 1/2012 | Blonder ................ F03D 5/00 416/132 B |

FOREIGN PATENT DOCUMENTS

| | | | |
|---|---|---|---|
| CN | 201350351 Y | 11/2009 | |
| CN | 202410187 U | 9/2012 | |
| GB | 1066 | 0/1901 | |
| GB | 491153 | 2/1938 | |
| GB | 831380 * | 3/1960 | ............ B29C 44/12 |
| JP | S5523354 A | 2/1980 | |

* cited by examiner

WIND SPINNER

CROSS-REFERENCE TO RELATED APPLICATION(S)

This U.S. patent application is a first-filed patent application and does not rely for priority on any other patent application.

FIELD OF THE INVENTION

The present invention concerns a wind spinner, which may be employed as a wind-activated, decorative embellishment for a garden, home, or other suitable location.

DESCRIPTION OF THE RELATED ART

As should be apparent, the prior art is replete with examples of garden ornaments and embellishments of various kinds and constructions. With respect to those that are actuated by ambient wind conditions, weather vanes constitute a very old example of such devices.

In other examples, such as U.S. Pat. No. 6,687,979 (hereinafter "the '979 patent"), a wind indicator is described with a multi-vaned impeller rotating about an axis perpendicular to an axis defined by a shaft supporting the impeller.

While describing and claiming a wholly different construction, U.S. Pat. No. 6,592,424 (hereinafter "the '424 patent") describes a wind indicator with an impeller that also rotates along an axis that is perpendicular to an axis defined by a shaft supporting the impeller.

In another prior art example, according to the English abstract and drawings, Chinese Patent No. CN 201308777 (hereinafter "CN '777") describes a multi-layer toy windmill with a rotating shaft, and a rotor mounted on the rotating shaft that includes at least two impellers that turn when subjected to the wind.

In still another prior art apparatus, Chinese Patent No. CN 201350351 (hereinafter "CN '351") describes a detachable toy wind spinner with a plurality of blades, where the spinner rotates along an axis formed by the shaft on which the spinner is located.

According to the English abstract and drawings, Chinese Patent No. CN 202410187 (hereinafter "CN '187") describes a wind spinner with a rotor having a plurality of elastic vanes. The vanes rotate around an axis that is perpendicular to an axis defined by the shaft.

Along similar lines, U.S. Pat. No. 4,582,497 (hereinafter "the '497 patent") describes a decorative spinner akin to a traditional pinwheel.

Separately, U.S. Pat. No. 5,085,075 (hereinafter "the '075 patent") describes a weather vane with a rotating device that simulates a running bird.

Additionally, U.S. Pat. No. 5,269,656 (hereinafter "the '656 patent") describes an impeller with flexible impeller blades.

Finally, U.S. Pat. No. 7,648,339 (hereinafter "the '339 patent") describes a fan with fabric blades.

It is in the context of this confluence of factors that the present invention was developed.

SUMMARY OF THE INVENTION

The present invention addresses one or more of the deficiencies noted with respect to the prior art.

The present invention provides for a wind spinner that includes a body, at least one rod attached to the body for rotation about a blade axis, at least two blades disposed at opposing ends of the rod, forming at least one pair of blades, and at least one blade support disposed within each blade. The at least one blade support includes a central portion disposable on the at least one rod. The central portion is attached to at least one wing portion that extends outwardly therefrom to provide internal support to the blade. In addition, the blades are angled at a blade angle and at a position on the at least one rod such that wind passing thereover causes the at least one pair of blades to rotate about the blade axis.

The wind spinner also may include a blade pivot connected to the body through which the at least one rod passes. The at least one rod may be angled with respect to the blade pivot so that the at least one blade support establishes the blade angle.

In one contemplated embodiment of the present invention, the wind spinner may include a blade pivot connected to the body through which the at least one blade rod passes. The at least one blade support may be angled with respect to the at least one rod so that the at least one blade support established the blade angle.

In a further embodiment, it is contemplated that the at least one rod may include a first rod disposed on a first side of the body and a second rod disposed on the second side of the body. If so, it is contemplated that the first rod and the second rod will rotate about the blade axis.

Separately, it is contemplated that the at least one rod may include a first rod and a second rod. The first rod and the second rod rotate about separate blade axes.

In another contemplated embodiment of the present invention, it is contemplated that the wind spinner will include a stake pivot mounted atop the stake, permitting the body to rotate about a rotational axis, a blade rod disposed through the stake pivot, a first blade pivot mounted to a first end of the blade rod, a second blade pivot mounted to a second end of the blade rod, a first pair of blades mounted to the first blade pivot for rotation about the blade axis, and a second pair of blades mounted to the second blade pivot for rotation about the blade axis.

If so, the wind spinner also may include a first rod connecting the first pair of blades to the first blade pivot, and a second rod connecting the second pair of blades to the second blade pivot.

In this embodiment, it is contemplated that the first rod will pass through the first blade pivot at an angle defining the blade angle and that the second rod will pass through the second blade pivot at an angle defining the blade angle.

For the wind spinner of the present invention, it is contemplated that the body and the at least one pair of blades are covered in fabric. The fabric may be either woven or non-woven.

In still another embodiment of the present invention, it is contemplated that the blades include a reinforcing layer beneath the fabric to provide rigidity to the fabric.

The at least one pair of blades may include two pairs of blades rotational about the blade axes. If so, the two pairs of blades may counter-rotate with respect to one another. Alternatively, the two pairs of blades may co-rotate with respect to one another.

It is contemplated that the two pairs of blades may be mounted on a first side of the body and another of the two pairs of blades is mounted on a second side of the body, opposite to the first.

In addition, it is contemplated that the wind spinner of the present invention may be constructed such that the at least one pair of blades comprises three or more pairs of blades rotational about at least one blade axis.

It is also contemplated that the body of the wind spinner will alter its orientation in response to the wind passing thereover.

Further aspects of the present invention will be made apparent form the paragraphs that follow.

BRIEF DESCRIPTION OF THE DRAWING(S)

The present invention will now be described in connection with the drawings appended hereto, in which.

DETAILED DESCRIPTION OF EMBODIMENT(S) OF THE INVENTION

The present invention will now be described in connection with one or more embodiments thereof. The discussion of the embodiments is not intended to be limiting of the present invention. To the contrary, any discussion of embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

Figure 1:
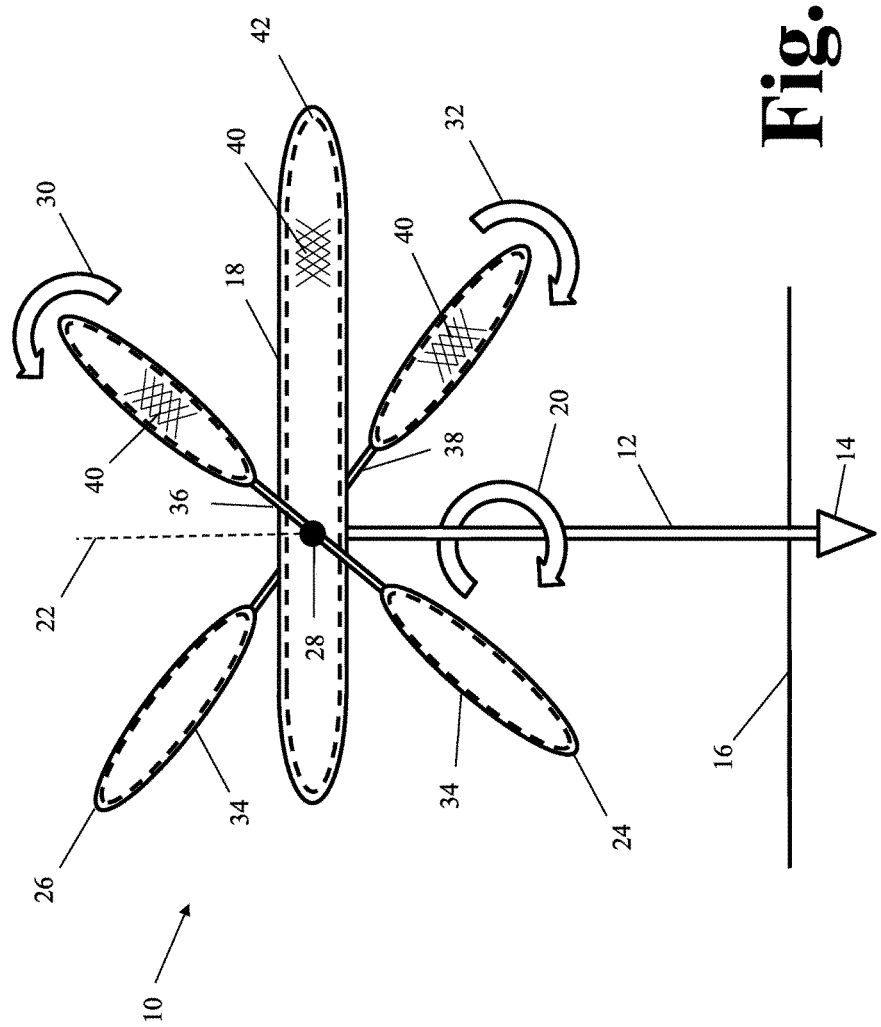
FIG. 1 is an elevational, side view of a first contemplated embodiment of the wind spinner of the present invention.

With reference to FIG. 1, the present invention is directed to the construction of a wind spinner 10 that may be deployed in a garden or other suitable location. In FIG. 1, the wind spinner 10 is depicted generically, without any specific shape or form. This depiction is intentional, as the wind spinner 10 may be constructed from any shape and may be provided with any surface indicia without departing from the scope of the present invention.

Specifically, as illustrated in FIGS. 6-12, the wind spinner 10 may be fashioned into any shape. The embodiments illustrated in FIGS. 6-12 are merely exemplary of the enormous variety of embodiments that comprise the present invention.

With continued reference to FIG. 1, the wind spinner 10 is contemplated to be mounted atop a stake 12 that may have a pointed end 14 for insertion into the ground 16. As should be apparent to those skilled in the art, however, the wind spinner 10 need not be constructed to be inserted into the ground 16. It is contemplated that the wind spinner 10 may be constructed so that it may be affixed to any suitable surface, as required or as desired. For example, the wind spinner 10 may be mounted in a bracket attached to a fixed surface.

Separately, it is contemplated that the wind spinner 10 may be secured from above. For example, the wind spinner 10 may hang from an overhead surface. In this alternative contemplated embodiment, the wind spinner 10 may be suspended from a suspensory device such as a rod, string, rope, chain, and/or wire, which is attached to the point above the wind spinner 10. If so, the wind spinner 10 is contemplated to rotate about the suspensory device in the same manner that the wind spinner 10 rotates about the stake 12. In this embodiment, the axis of rotation is defined by the suspensory device and is referred to as a suspensory axis.

Whether the wind spinner 10 rotates about a stake axis 22 or a suspensory axis, the axis of rotation is referred to herein as the rotation axis 22. The rotation axis 22, therefore, contemplates either mode of securement of the wind spinner 10, whether from below or from above.

As illustrated in the embodiments shown in FIGS. 1-11, the wind spinner 10 includes a body 18 that is contemplated to be pivotally mounted atop the stake 12. As a result, the body 18 is expected to rotate about the stake 12 in the direction indicated by the arrow 20. The body 18 is contemplated to pivot about the stake 12 in either rotational direction, without any bias for one direction over the other. As may be apparent, the body 18 is contemplated to move, like a weather vane, in response to forces applied by any wind impingent thereon.

In another contemplated embodiment, the wind spinner 10 may be constructed so that it rotates in only one direction consistent with the arrow 20.

Two rotating arms 24, 26 are pivotally connected to the body 18 such that they rotate about an axis 28 perpendicular to the axis 22. The axis 28 is shown more clearly in FIG. 2. The arm 24 is contemplated to rotate in a counterclockwise direction as indicated by the arrow 30. The arm 26 is contemplated to rotate in a clockwise direction as indicated by the arrow 32.

As should be apparent from the foregoing, in the embodiment of the wind spinner 10 that is depicted in FIG. 1, the arm 24 is contemplated to be mounted so that it exhibits a rotation opposite to that of the arm 26. In other words, the arm 24 is contemplated to counter-rotate with respect to the arm 26. It is contemplated, however, that the arms 24, 26 may be arranged so that they rotate in the same direction. In other words, the arms 24, 26 may co-rotate with respect to one another.

Each arm 24, 26 is provided with two blades 34, one at each end. The blades 34 are angled and positioned such that the blades 34 act similar to the blades on a propeller for an aircraft. The movement (or blowing) of wind 56 provides the motive force to rotate the blades 34 in the predetermined direction of rotation 30, 32. It is for this reason that the axis 28 also is referred to herein as the blade axis 28.

It is noted that one aspect of the wind spinner 10 of the present invention contemplates that the arms 24, 26 are positioned on opposite sides of the body 18. With reference to FIG. 1, the arms 24 is in front of the body 18 and the arm 26 is behind the body 18.

It is another aspect of the present invention that each arm 24, 26 is provided with a pair of blades 34, one at each end of the arms 24, 26. In alternate embodiments, it is contemplated that a plurality of arms 24, 26 may support a plurality of blades 34 without departing from the scope of the present invention.

Figure 2:
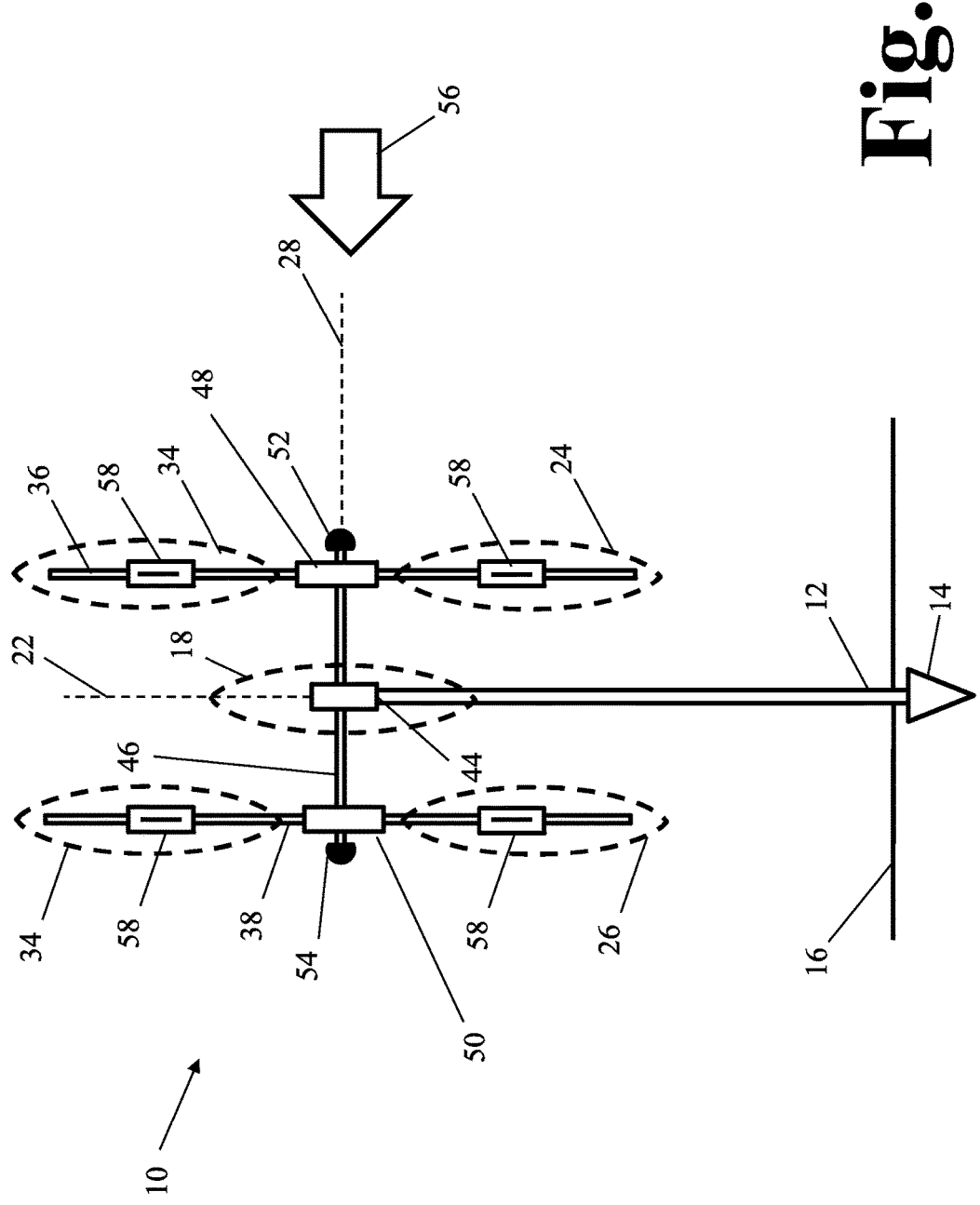
FIG. 2 is an elevational, front view of the embodiment of the present invention illustrated in FIG. 1.

As illustrated in FIG. 2, the wind spinner 10 is contemplated to include a stake pivot 44 that is mounted atop the stake 12. The stake pivot 44 permits the body 18 of the wind spinner 10 to rotate in the direction of the arrow 20, as discussed above. The construction of the stake pivot 44 is not critical to the operation of the present invention. Accordingly, further details concerning the construction of the stake pivot 44 are not provided herein.

A blade rod 46 extends through the stake pivot 44. The blade rod 46 extends outwardly from the stake pivot to the two arms 24, 26. The blade rod 46 supports the arms 24, 26 and defines the blade axis 28. As noted above, the arms 24, 26 rotate around the axis 28 in the directions of the arrows 30, 32.

A first blade pivot 48 and a second blade pivot 50 are disposed adjacent to either end of the blade rod 46. The blade pivots 48, 50 permit the arms 24, 26 to rotate around the blade rod 46 in the directions of the arrows 30, 32, as discussed above. So that the arms 24, 26 are retained on the blade rod 46, a first end cap 52 and a second end cap 54 are placed on the ends of the blade rod 46, as illustrated.

As should be apparent, the caps 52, 54 are not required to practice the present invention. The ends of the blade rod 46 may be fashioned such that the caps 52, 54 are not needed to retain the rods 36, 38 thereon.

It is noted that the rods 36, 38 may be unitary structures. In another contemplated embodiment, the rods 36, 38 may comprise two separate rods that connect to the blade pivots 48, 50. The exact construction of the rods 36, 38 is not critical to the construction of the wind spinner 10 of the present invention, as should be apparent to those skilled in the art.

As shown in FIG. 2, the rods 36, 38 provide the framework for the blades 34. As illustrated, the rods 36, 38 connect to the blade pivots 48, 50 at approximately a midpoint along the rods 36, 38. This assures that the rods 36, 38 are suitably balanced to facilitate rotation in the wind 56.

As noted above, the blades 34 are contemplated to respond to the wind 56. As such, the blades 34 are contemplated to be mounted on the rods 36, 38 so that the blades 34 are angled to the winds 56. In other words, the blades 34 are contemplated to be mounted to the rods 36, 38 at an angle. As a result, when the wind 56 blows, the blades 34 cause the arms 24, 26 to rotate.

So that the blades 34 retain their shape and angular orientation, the blades 34 incorporate a blade support 58 therein. The blade support 58 is contemplated to extend across the blades 34 and maintain the blades 34 in a suitable orientation (or angle of incidence) with respect to the wind 56 so that the blades 34 are animated by the wind 56.

Figure 3:
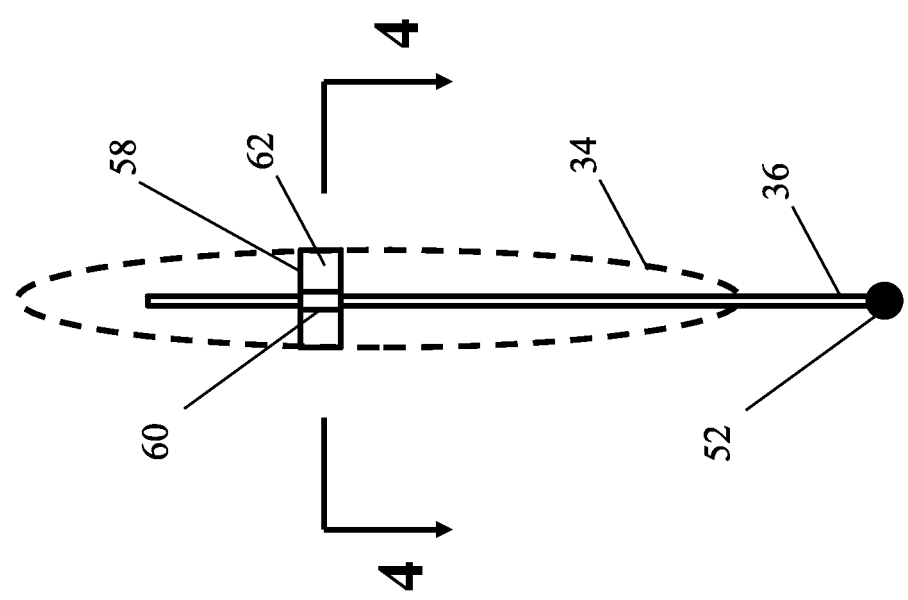
FIG. 3 is an enlarged view of one of the blades illustrated in FIGS. 1 and 2.

FIG. 3 is an elevational, front view of one of the blades 34 on the arms 24, 26 of the wind spinner 10 of the present invention. The fabric 40 covering the blade 34 is shown in dotted line format. The blade support 58 is shown in larger detail in this view.

The blade support 58 is contemplated to extend across the blade 34 from one lateral side to the other. As such, the blade support 58 is contemplated to help maintain the blade 34 in a suitable angle and orientation during the operational lifetime of the wind spinner 10.

It is contemplated that the blade support 58 will be made from a suitable rigid material such as plastic. As should be apparent to those skilled in the art, however, any other suitable material may be employed without departing from the scope of the present invention. For example, the blade support may be made from metal, composite materials, etc.

The blade support 58 is contemplated to have a central portion 60, through which the rod 36 passes. Two wing elements 62 extend outwardly from the central portion 60, one from each side of the central portion 60. The wing elements 62 provide rigid stability to the construction of the blade 34 so that the blade 34 maintains a suitable angle and orientation for the operational lifetime of the wind spinner 10.

Figure 4:
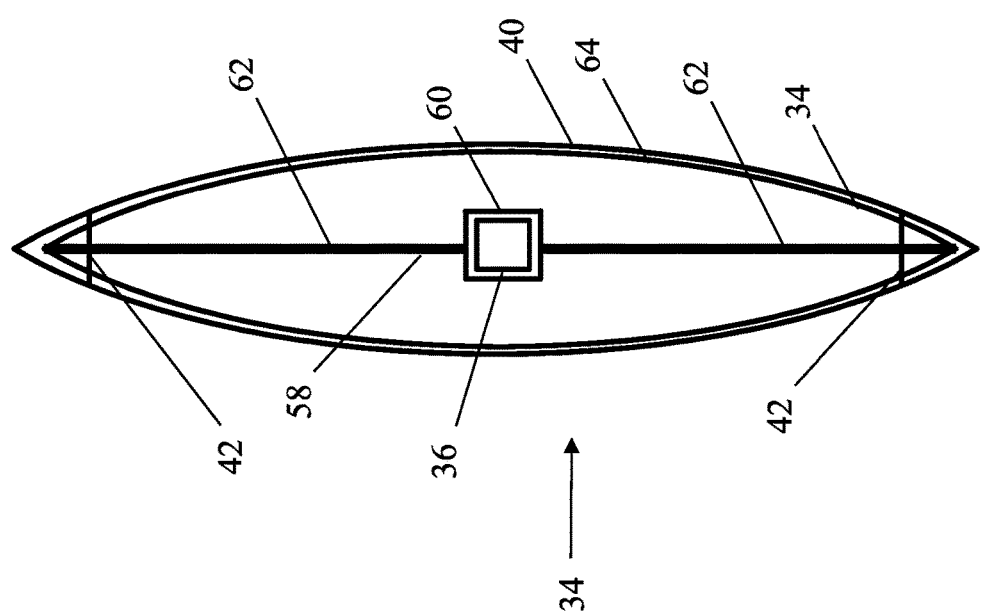
FIG. 4 is a cross-sectional view of the blade illustrated in FIG. 3, showing one contemplated construction therefor, taken along the line 4-4 in FIG. 3.

FIG. 4 is a cross-sectional view of the blade 34 illustrated in FIG. 3. The cross-section is taken along the line 4-4 in FIG. 3.

As illustrated in FIG. 4, the blade support 58 includes the central portion 60 through which the rod 36 passes. In the illustrated embodiment, the rod 36 has a square cross-section as does the opening through the central portion 60. The square cross-section of the rod 36 is intended to simplify manufacture of the wind spinner 10 of the present invention. Specifically, the rod 36 is contemplated to be mounted in the first blade pivot 48 at an angle such that, when the blade 34 is inserted through the rod 36, the blade 34 is at the correct angle and orientation.

FIG. 4 also illustrates one additional aspect of the blade 34 of the present invention. Specifically, the shell of the blade 34 includes two layers. The outer layer is the fabric layer 40, as discussed above. While the fabric layer 40 may have sufficient rigidity to be employed by itself as the covering for the blade 34, it is contemplated that the fabric 40 may benefit from a reinforcing layer of plastic 64 thereunder. As such, in the embodiment illustrated in FIG. 4, the surface of the blade 34 includes an outer fabric layer 40 and an inner plastic layer 64.

The inner plastic layer 64 is contemplated to be made from a transparent plastic or other suitable material. Being transparent, the inner plastic layer 64 should not alter the exterior appearance of the wind spinner 10, even when subjected to strong sunlight conditions. While a transparent plastic is contemplated for the plastic layer 64, any suitable alternative may be employed without departing from the scope of the present invention.

As also illustrated in FIG. 4, the stitching 42 for the blade 34 is contemplated to pass through the fabric layer 40 and the plastic layer 64 on both sides of the blade 34, thereby securing the sides of the blade 34 to one another. The stitching 42 also is contemplated to pass through the wing elements 62, as shown in FIG. 4. As such, the various structures that form the blade 34 are secured to one another.

Figure 5:
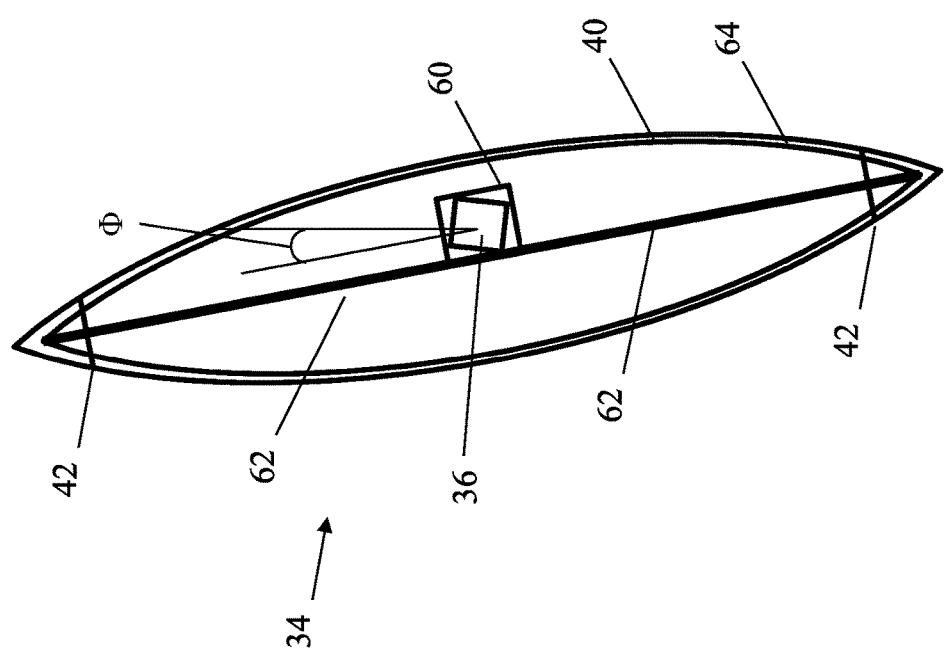
FIG. 5 is a cross-sectional view of another embodiment the blade illustrate in FIG. 3, where the construction of the blade differs from the construction illustrated in FIG. 4.

FIG. 5 is a cross-sectional view similar to the view provided in FIG. 4. FIG. 5, however, presents a variation of the embodiment illustrated in FIG. 4.

FIG. 5 presents an embodiment of the blade 34 where the central portion 60 is attached to the wing portions 62 in an offset arrangement. In addition, the opening through which the rod 36 passes is disposed at an angle to the exterior surface of the central portion 60. The angular displacement establishes an angle Φ that is suitable to establish an angle of incidence for the wind 56.

As should be apparent, in the embodiment illustrated in FIG. 4, the angle of incidence Φ to the blade 34 is established by the angle of the opening through the first blade pivot 48. In the embodiment illustrated in FIG. 5, the angle of incidence to the blade 34 is established by the angle Φ in the central portion 60.

While FIGS. 4 and 5 illustrate two embodiments for the blades 34 on the wind spinner 10 of the present invention, other variations may be employed without deviating from the scope of the present invention.

FIGS. 6-12 illustrate several additional embodiments of the wind spinner 10 of the present invention.

Figure 6:
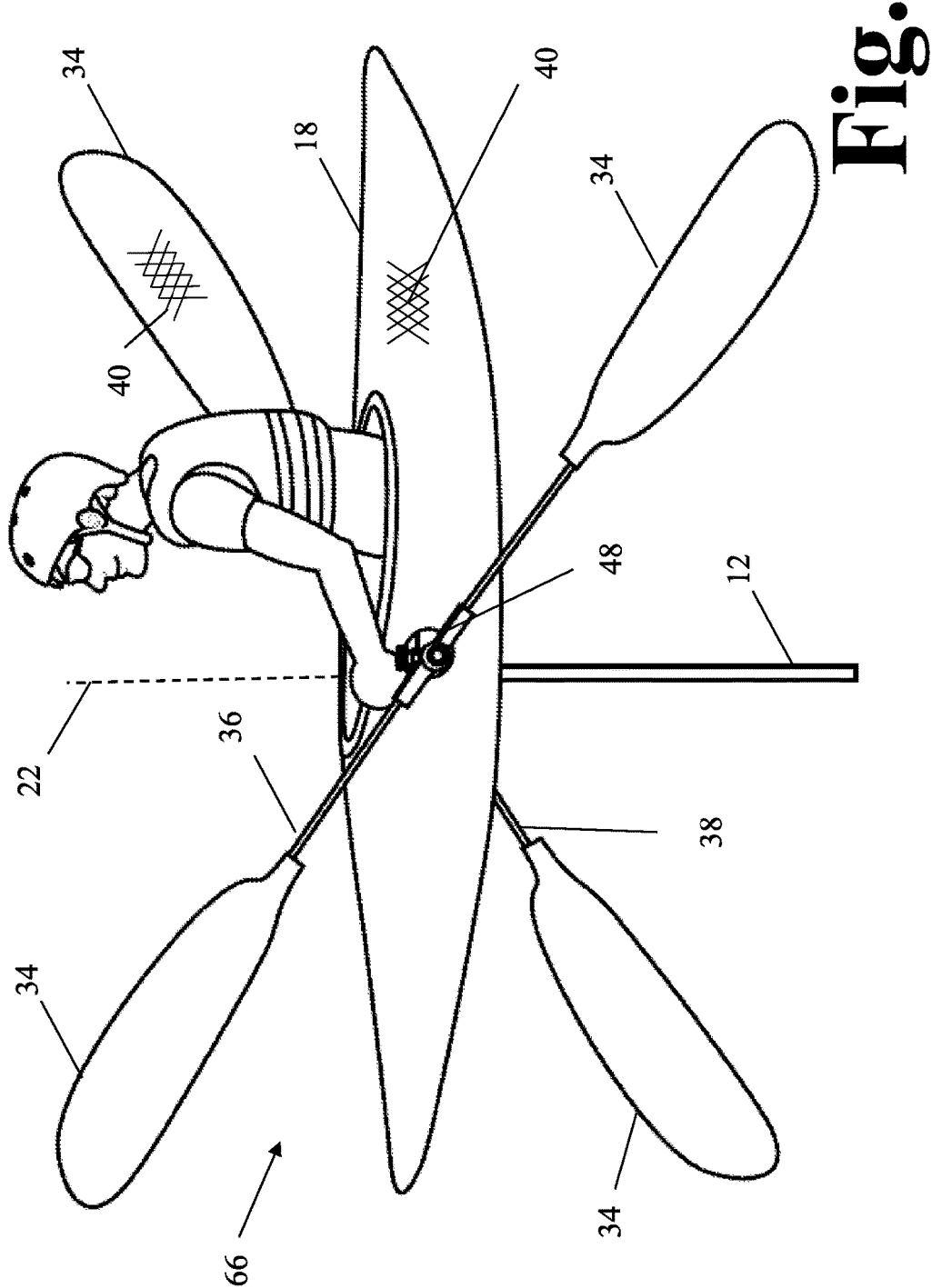
FIG. 6 is an elevational, side view of a second embodiment of the wind spinner of the present invention, being shown as a kayaker paddling his kayak.

In particular, FIG. 6 illustrates a second embodiment of a wind spinner 66 according to the present invention. The wind spinner 66 is designed to appear as a kayaker rowing his kayak. As such, the blades 34 of the wind spinner 66 are shaped to appear like the paddle portions of oars for the kayak.

Figure 7:
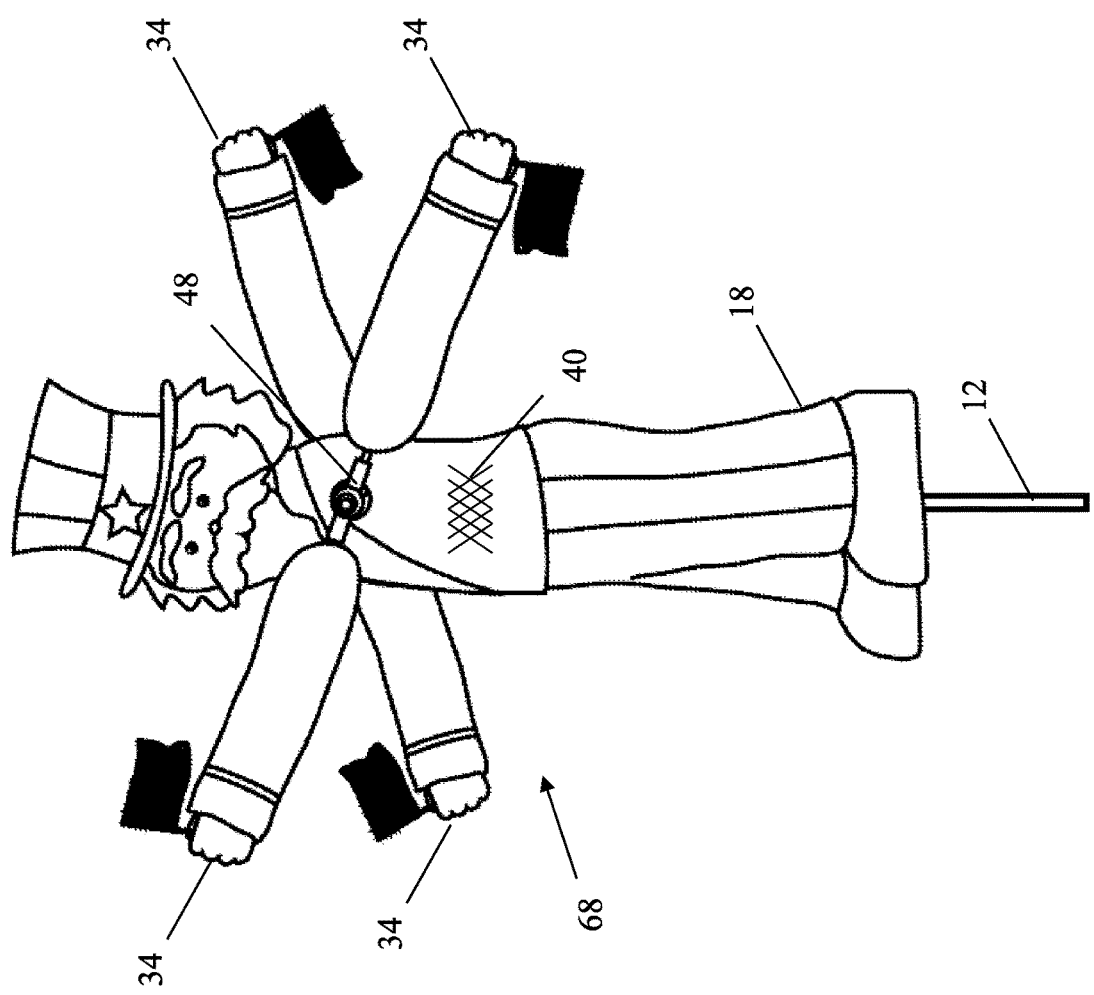
FIG. 7 is an elevational, side view of a third embodiment of the wind spinner of the present invention, being shown as a variation of Uncle Sam waving his arms.

FIG. 7 illustrates a third embodiment of a wind spinner 68 according to the present invention. This embodiment is a stylized depiction of Uncle Sam. For this wind spinner 68, the arms of Uncle Sam are the blades 23 that rotate in the wind 56.

Figure 8:
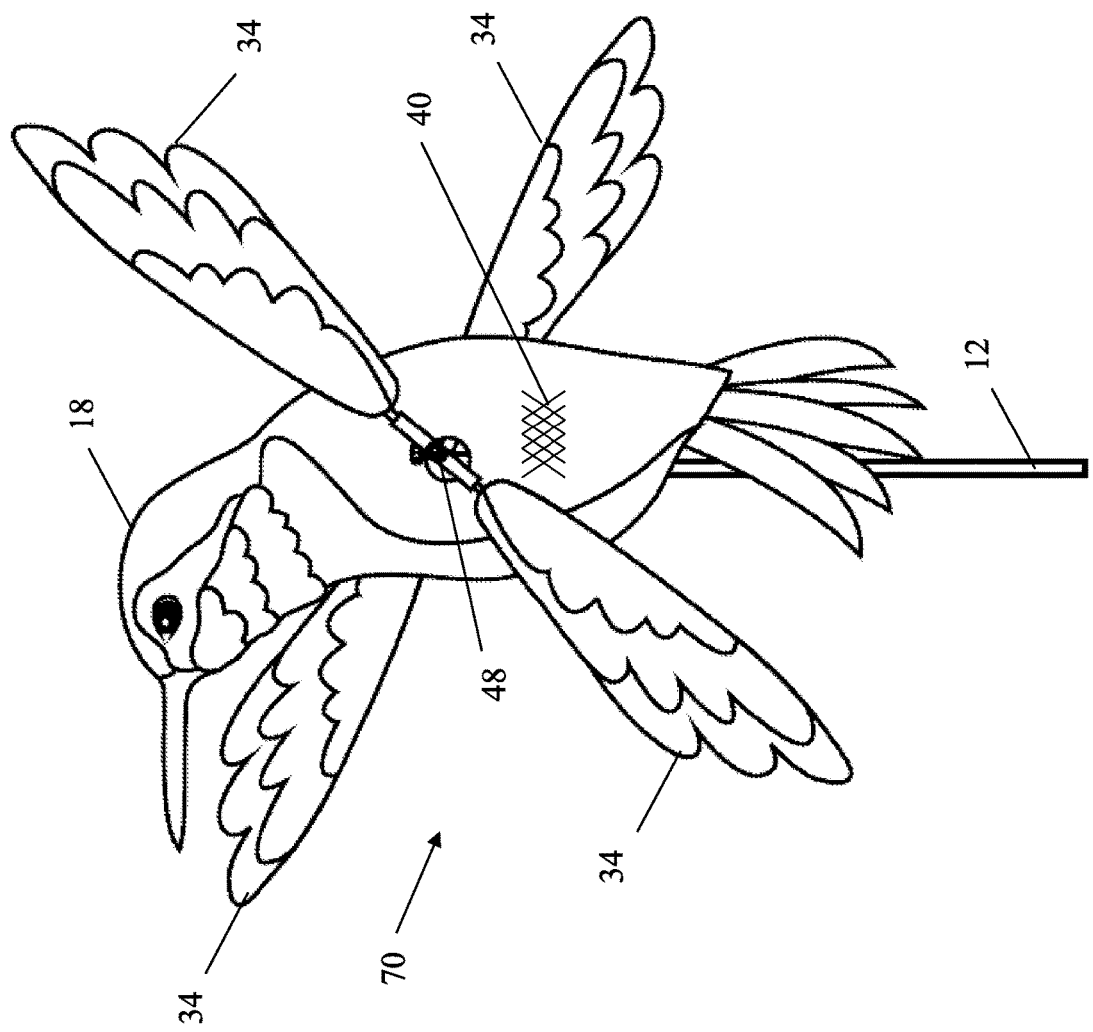
FIG. 8 is an elevational, side view of a fourth embodiment of the wind spinner of the present invention, being shown as a stylized version of a hummingbird flapping its wings.

FIG. 8 is an illustration of a fourth embodiment of a wind spinner 70 according to the present invention. In this embodiment, the body 18 of the wind spinner is in the shape of a hummingbird. The wings of the hummingbird are the blades 34 that move in response to the wind 56.

Figure 9:
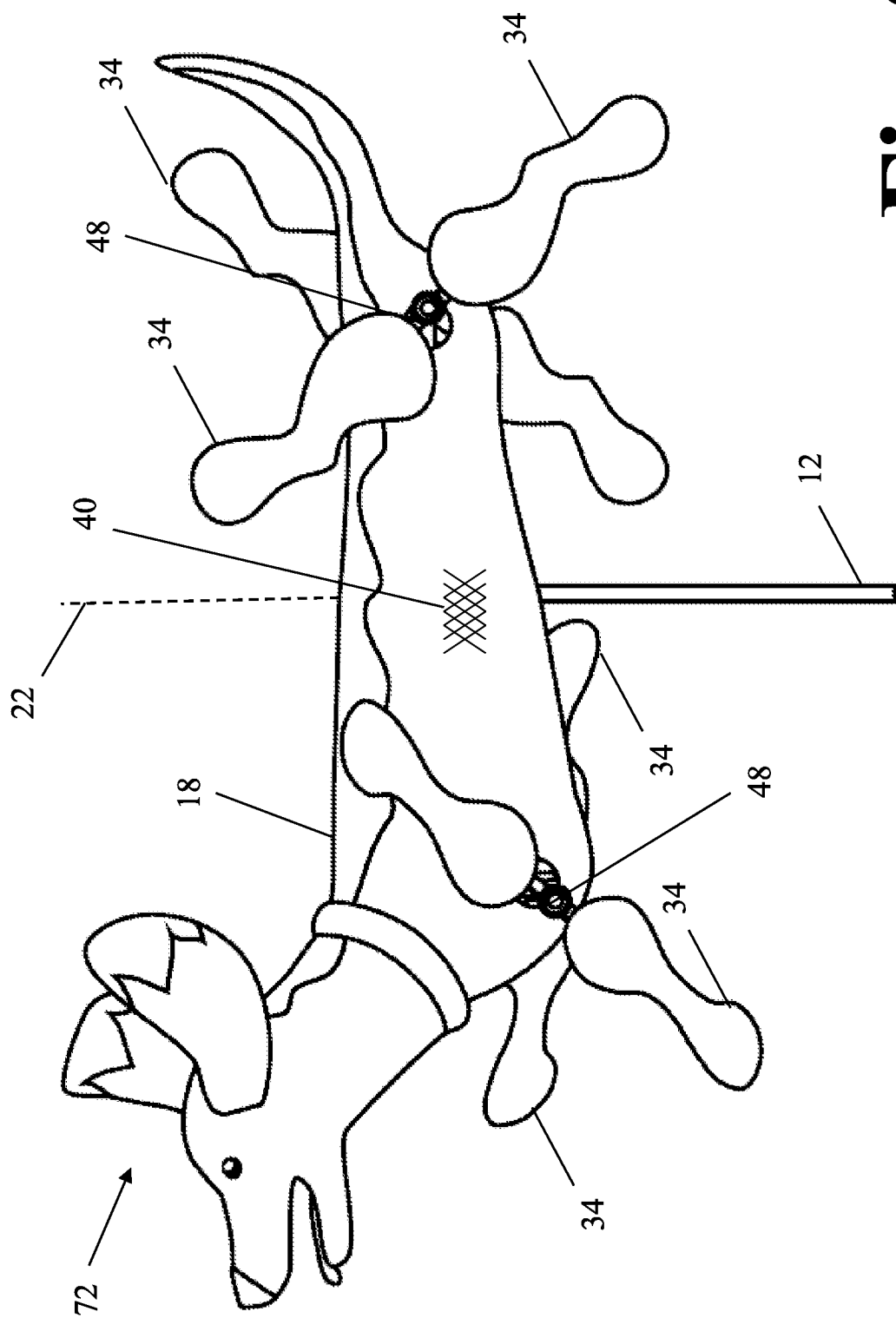
FIG. 9 is an elevational, side view of a fifth embodiment of the wind spinner of the present invention, being shown as a dachshund in motion.

FIG. 9 is an illustration of a fifth embodiment of a wind spinner 72 according to the present invention. Here, the wind spinner 72 is intended to appear like a running dachshund or other small dog. The legs of the dachshund are the blades 34. In this embodiment, there are two sets of blades 34, rather than a single set. As such, it is noted that the present invention is contemplated to encompass any number of separate sets of blades 34 as may be required or desired.

Figure 10:
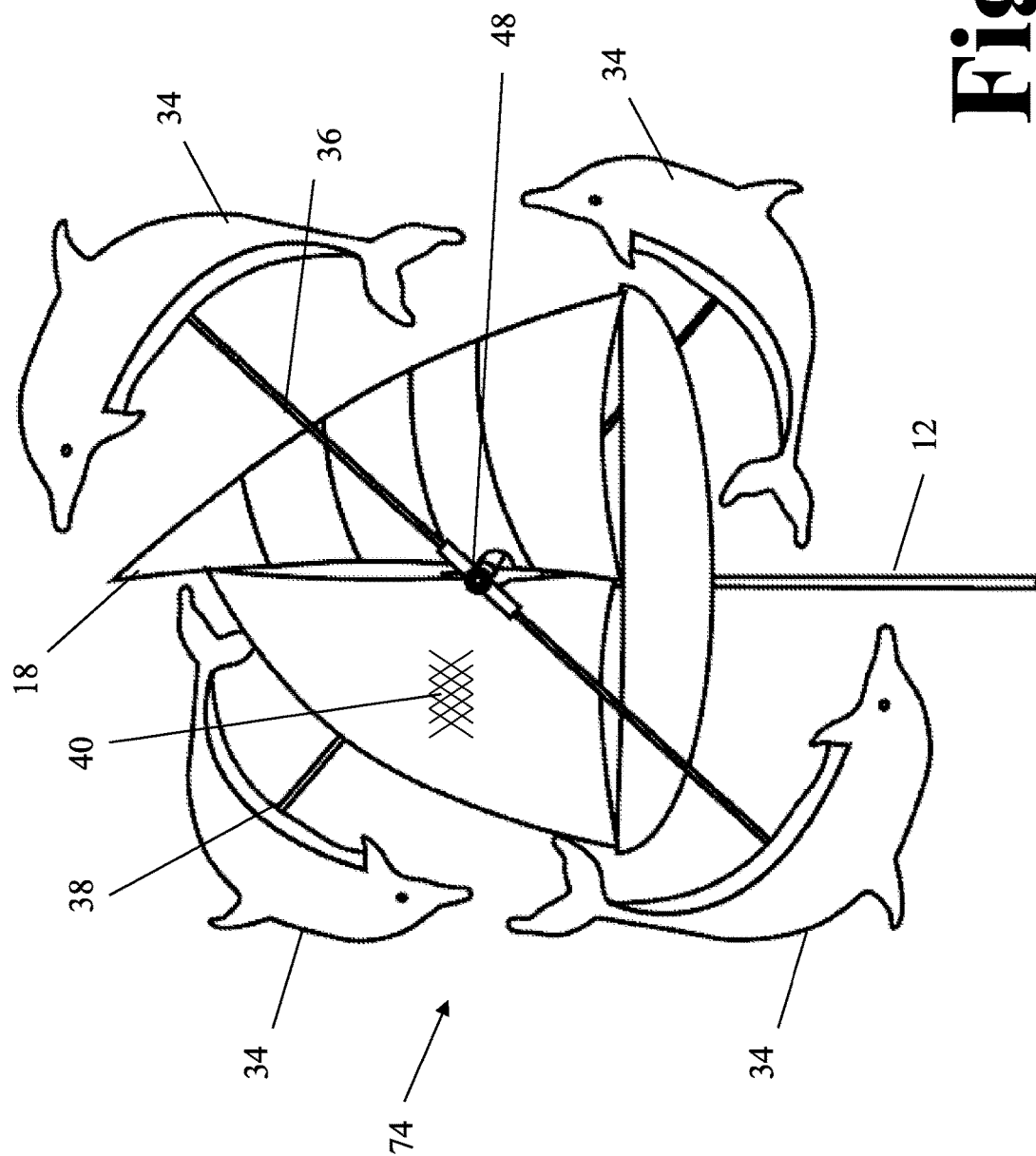
FIG. 10 is an elevational, side view of a sixth embodiment of the wind spinner of the present invention, being shown as a group of dolphins frolicking around a sailboat.

FIG. 10 is an illustration of a sixth embodiment of a wind spinner 74 according to the present invention. Here, the body 18 of the wind spinner 74 is shaped to resemble a sailboat. The blades 34 are shaped to resemble dolphins frolicking around the sailboat.

Figure 11:
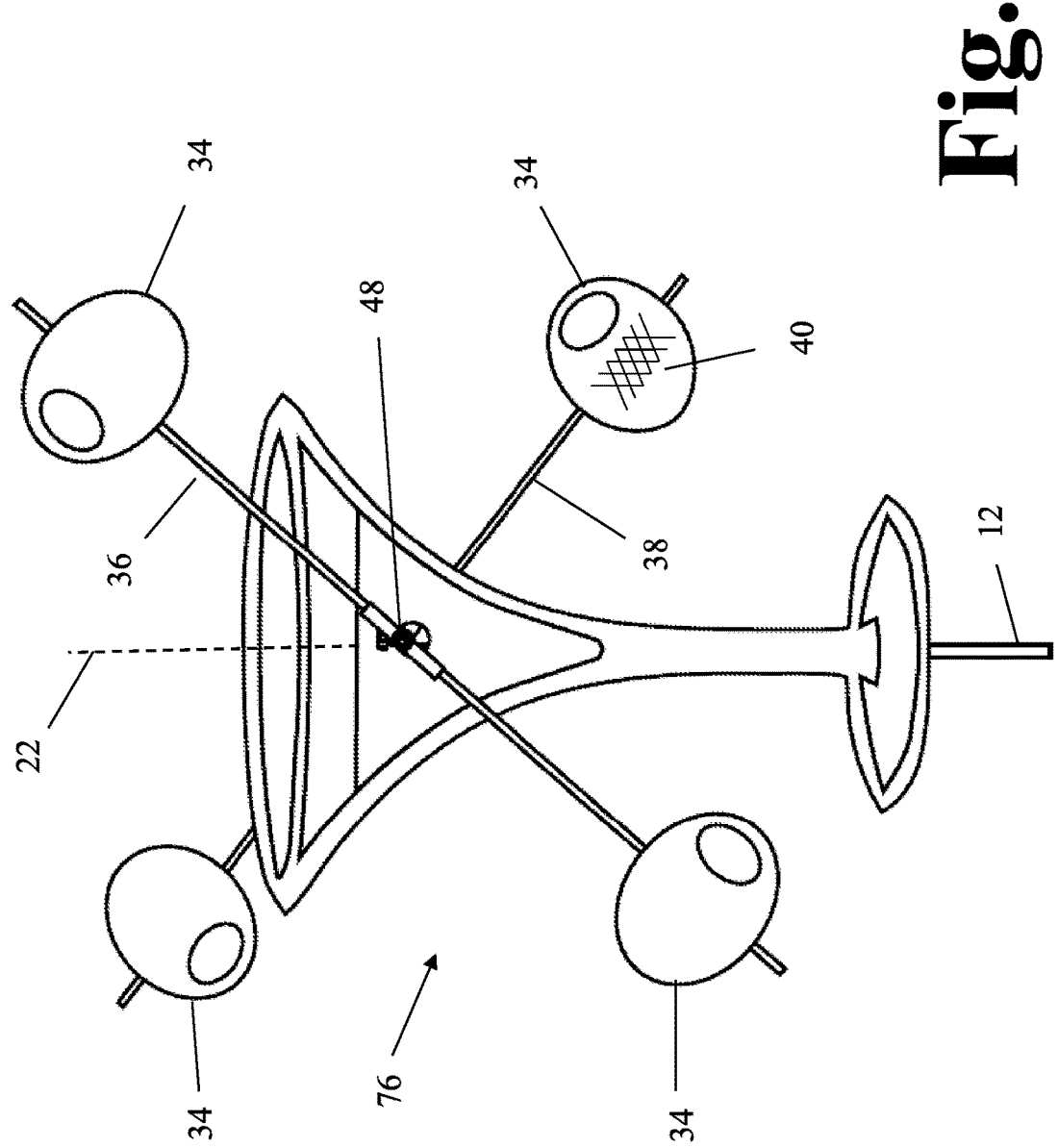
FIG. 11 is an elevational, side view of a seventh embodiment of the wind spinner of the present invention, being shown as a martini with four olives rotating therearound.

FIG. 11 is an illustration of a seventh embodiment of a wind spinner 76 according to the present invention. Here, the body 18 is shaped to resemble a martini. The blades 34 are shaped to resemble olives spinning around the martini glass.

Figure 12:
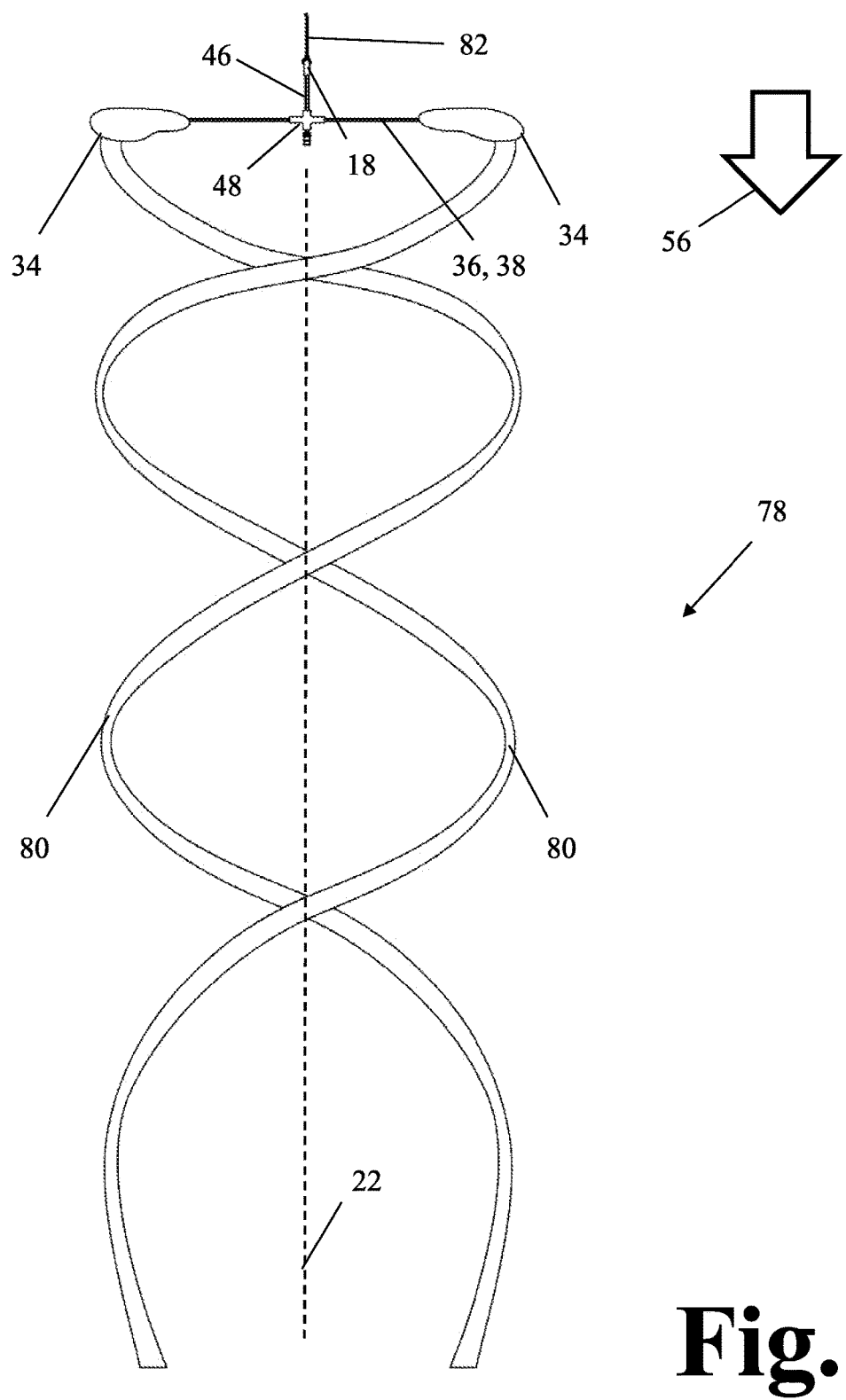
FIG. 12 is an elevational, side view of an eighth embodiment of the wind spinner of the present invention, being shown with a corkscrew shape.

FIG. 12 is an illustration of an eighth embodiment of a wind spinner 78 according to the present invention. Here, the body 18 has been reduced to a minimal form. Specifically, the body 18 is formed as a simple connector. While the body 18 rotates, it is contemplated that the body may not rotate, such that rotational motion is defined by the blade pivot 48.

While not shown, the blade reinforcements 58 are located within the blades 34 as in prior embodiments.

In addition, two or more helical embellishments 80 hang from the blades 34. The helical embellishments 80 may be rigid, semi-rigid, or flexible, as required or as desired. In an alternative embodiment, the helical embellishments may be straight ribbons that hang from the blades 34, exhibiting a helical shape only after activation of the wind spinner 78 by the wind 56.

It is noted that the wind spinner 78 shown in FIG. 12 is contemplated to hang from a point above the wind spinner 78. As illustrated, the wind spinner 78 is contemplated to hang from a suspensory device 82, as shown. The wind spinner 78 rotates around the axis 22. The blades 34 are disposed such that the wind 56 causes the spinner 78 to rotate, as discussed in connection with other embodiments.

As should be apparent from FIGS. 6-12, there are innumerable variations of the present invention that may be employed by those skilled in the art without departing from the scope of the present invention.

As noted above, the embodiment(s) described herein are intended to be exemplary of the wide breadth of the present invention. Variations and equivalents of the described embodiment(s) are intended to be encompassed by the present invention, as if described herein.

What is claimed is:

1. A wind spinner, comprising:
a body;
at least one rod attached to the body for rotation about a blade axis;
at least two blades disposed at opposing ends of the at least one rod, forming at least one pair of blades,
wherein each blade is covered by fabric on first and second sides, and
wherein each blade defines a leading edge and a trailing edge;
at least one blade support disposed within each blade;
wherein the at least one blade support comprises
a central portion disposed on the at least one rod, and
two wing elements extending outwardly from the central portion to provide internal support to the respective blade,
wherein the two wing elements extend internally to the respective blade from the leading edge to the trailing edge, and
wherein the at least two blades are angled at a blade angle and at a position on the at least one rod such that wind passing thereover causes the at least one pair of blades to rotate about the blade axis; and
stitching connecting the first and second sides to one another and also to the two wing elements.

2. The wind spinner of claim 1, further comprising:
a blade pivot connected to the body through which the at least one rod passes,
wherein the at least one rod is angled with respect to the blade pivot so that the at least one blade support establishes the blade angle.

3. The wind spinner of claim 1, further comprising:
a blade pivot connected to the body through which the at least one rod passes,
wherein the at least one blade support is angled with respect to the at least one rod so that the at least one blade support establishes the blade angle.

4. The wind spinner of claim 1, wherein:
the at least one rod comprises a first rod disposed on a first side of the body and a second rod disposed on the second side of the body, and
the first rod and the second rod rotate about the blade axis.

5. The wind spinner of claim 1, wherein:
the at least one rod comprises a first rod and a second rod, and
the first rod and the second rod rotate about separate blade axes.

6. The wind spinner of claim 1, further comprising:
a stake;
a stake pivot mounted atop the stake, permitting the body to rotate about a rotational axis;
a blade rod disposed through the stake pivot;

a first blade pivot mounted to a first end of the blade rod;

a second blade pivot mounted to a second end of the blade rod;

a first pair of blades mounted to the first blade pivot for rotation about the blade axis; and a second pair of blades mounted to the second blade pivot for rotation about the blade axis.

7. The wind spinner of claim 6, further comprising:

a first rod connecting the first pair of blades to the first blade pivot; and a second rod connecting the second pair of blades to the second blade pivot.

8. The wind spinner of claim 7, wherein:

the first rod passes through the first blade pivot at an angle defining the blade angle; and the second rod passes through the second blade pivot at an angle defining the blade angle.

9. The wind spinner of claim 1, wherein the body is covered in the fabric.

10. The wind spinner of claim 9, wherein the fabric is either woven or non-woven.

11. The wind spinner of claim 9, wherein the respective blades include a reinforcing layer beneath the fabric to provide rigidity to the fabric.

12. The wind spinner of claim 1, wherein the at least one pair of blades comprises two pairs of blades rotational about the blade axis.

13. The wind spinner of claim 12, wherein the two pairs of blades counter-rotate with respect to one another.

14. The wind spinner of claim 12, wherein the two pairs of blades co-rotate with respect to one another.

15. The wind spinner of claim 12, wherein one of the two pairs of blades is mounted on a first side of the body and another of the two pairs of blades is mounted on a second side of the body, opposite to the first side of the body.

16. The wind spinner of claim 1, wherein the at least one pair of blades comprises three or more pairs of blades rotational about at least one blade axis.

17. The wind spinner of claim 1, wherein the body rotates around a rotational axis in response to the wind passing thereover.

* * * * *